United States Patent [19]
Englisch

[11] 3,818,694
[45] June 25, 1974

[54] METHOD FOR REMOVING THE BURR OF CHAIN-LINKS

[76] Inventor: Adolf Englisch, 29 Weilerswister St., Cologne 51, Germany

[22] Filed: Mar. 13, 1972

[21] Appl. No.: 234,351

[30] Foreign Application Priority Data
Mar. 11, 1971 Germany.......................... 2166660

[52] U.S. Cl................................. 59/29, 83/34, 59/7
[51] Int. Cl............................................ B21l 15/00
[58] Field of Search .......................... 59/29, 7; 83/34

[56] References Cited
FOREIGN PATENTS OR APPLICATIONS
738,998 10/1955 Great Britain.......................... 59/29
214,702 8/1967 Sweden.................................. 59/29

*Primary Examiner*—Donald R. Schran
*Attorney, Agent, or Firm*—Holman & Stern

[57] ABSTRACT

A method and apparatus for removal of weld-burrs from chain links formed by welding rods of circular cross-section. A cutter having a cutting edge shaped to conform to the periphery of the cross section of the chain link rod and extending over substantially 180° of the chain link periphery is mounted so as to be capable of reciprocatory movement along an axis of the cutter, which axis is arranged to be parallel to a longitudinal plane of symmetry of the chain link. The cutter is also capable of controlled rotation about its own axis, the rotation being in a plane transverse to said longitudinal plane. A weld-burr which extends circumferentially of a chain link cross section is removed in two stages in a semicircular portion each time, by shearing the weld-burr in a longitudinal stroke of the cutter each time; the cutter is rotated on its own axis to be positioned for each longitudinal shearing and push off stroke from a first starting position. The stresses developing in the chain link during burr-removal operations are limited to those in a longitudinal direction of the chain link and accordingly the chain link need be secured during burr removal only in the longitudinal direction.

5 Claims, 8 Drawing Figures

PATENTED JUN 25 1974  3,818,694

METHOD FOR REMOVING THE BURR OF CHAIN-LINKS

FIELD OF THE INVENTION AND PRIOR ART

The instant invention concerns a method for removing burrs from chain links which are formed from a wire having a circular cross section. For the performance of this process, known in prior art is a device which is equipped with a trimming cutter which is movable into the direction of the lateral axis of the chain, wherein the cutter has a cutting edge which extends over 180° of the peripheral direction of the chain link.

This cutter is arranged to be forwardly movable, moving over the burrs in a direction of the peripheral axis of the chain link, the movement being caused by means of an operating mechanism, from a starting position which is located in one of the outer peripheral sections of the chain link, the movement also being expediently symmetrical to the center area of the chain. During this movement, the cutter removes the outer section of the burrs. For a complete removal of the burrs, such as those on an inner side of the chain link, the chain link is then ground.

Another prior art device uses a trimming cutter wherein the cutter for removal of burrs is not only provided with a first peripheral cutting edge of 180° but is also provided with two additional cutting edges which communicate with the first edge, whereby the first cutter edge is positioned at the front section and the additional cutter edges move in a direction of the surface line of the chain side; however, the cutting edges may also be arrow-shaped, whereby the lengths of these cutters extend beyond the width of the burrs. The operating mechanism is accordingly constructed in such a manner that after the burr is pushed out by the peripheral cutter into the direction of the lateral axis of the chain links, the cutter is subsequently so positioned that the side-cutters are in the area of the burr.

Through the tilting of the cutter by 90° into the opposite peripheral directions, the remaining inner burr-sections are peeled off (German Patent Specification No. 1,223,234 from which may also be noted the first-mentioned prior art).

However, both prior art constructions have certain disadvantages.

The first-mentioned device, eventhough simple in design, requires a separate processing of the chain link during a second working phase at a separate working station for the purpose of grinding; while the second-mentioned device has the disadvantage that the trimming cutter must be provided with three cutting edges which are precisely coordinated in their relative positions during formation and subsequent sharpening in use. On the other hand, there result axial cutting roughness with unequal transitions on the periphery of the trimmed weldpoints in the outer peripheral section. A third disadvantage in this prior art device consists in that due to the various working phases for the removal of the burrs at the outer peripheral section and the peeling off at the inner section, the trimming cutter is under complex stresses, including local stresses, which disadvantageously affect the operating mechanism, the control of the holder for the trimming cutter, the cutter itself, and the points where the cutter is attached.

SUMMARY OF THE INVENTION

The instant invention therefore has as its objective to avoid these aforesaid disadvantages particularly of the second-mentioned device and to perform the trimming process exclusively by a push-off process, i.e., by avoiding a peeling-off process.

This is accomplished in accordance with the instant invention by utilization of a trimming cutter which is movable in a longitudinal direction of the axis of the link-limb of a chain link. The cutter has a cutting edge which is tiltable around the axis of the chain link and which edge extends over 180° of the periphery of a link cross-section, so that the two semi-circumferences of the burr may be removed consecutively by being pushed and sheared off. The invention uses a sequence of operations wherein a trimming cutter is moved from its known starting position in front of the burr, then tilted by 90° in a known tilting direction in such a manner that one half of the cross section of the chain link side which is positioned symmetrically to the center plane of the link, is engaged by the trimming cutter which is then moved forward for the first partial trimming; the cutter is withdrawn subsequently. Thereafter, the trimming cutter is tilted by 180° into a symmetrical position in an opposite direction and again moved forward for the second partial trimming and is again withdrawn. Finally, the cutter is tilted back into the outer position by 90° and returned to the starting position.

The pushing out process results advantageously in forces exclusively into the longitudinal direction of the side of the chain link, whereby the link needs to be secured on the saddle only against longitudinal displacements; the guiding and movement sections are favorably utilized and the entire arrangement has an increased life span. The operations of tilting the cutter are made without special needs and may accordinly be made within short intervals of time. There is a decisive advantage in the present invention on account of the increased life of the equipment, and the presence of uniform trimming roughnesses over the entire trimming area as well as a precise trimming shearing operation; also, there is no considerable loss of time despite the number of movements of the cutter.

The instant inventive apparatus utilizes a prior art cutter and obtains the solution of the problem in a surprisingly simple manner through a sequence of operations which is changed from the second-mentioned prior art device, eliminating thereby one operational process-step, however, with an increase of the number of idle strokes of the cutter.

The apparatus of the instant invention may, in an advantageous manner, be modified for the purpose of reducing the processing time compared with this method, by utilizing a trimming device having two similar cutting edges which are arranged in opposite directions. In this modified arrangement, the cutter is moved in front of the burrs with elimination of some idle strokes; the cutter may be tilted by 90°, then moved beyond the burrs for the first sectional trimming process; the cutter may then be tilted by 180° and pulled back for the second sectional trimming step; it may then be brought to the outer position by tilting by 90°, and then moved back into the starting position.

BRIEF DESCRIPTION OF THE DRAWINGS

The instant invention will be described by means of a few exemplary embodiments by making reference to the illustrations in the accompanying drawings wherein.

DESCRIPTION OF PREFERRED EMBODIMENTS

Figure 1:
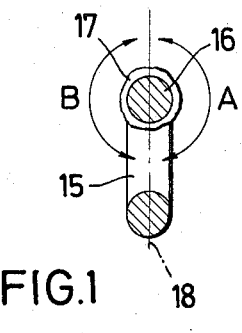
FIG. 1 illustrates a cross-sectional view through a chain link with the burr-formation, wherein the burr has not been removed.
Figure 2:
FIG. 2 shows a chain link of FIG. 1 subsequent to the first sectional trimming phase.
Figure 3:
FIG. 3 illustrates the chain link of FIG. 2 after the second sectional trimming phase.

As may be seen from FIG. 1, the chain link 15 will be treated on its side 16 in the area of the burr 17 on the link-limb in such a manner that the section A of the burr is first removed and then the section B is removed by pushing and shearing it through; the two sections A and B each extend over 180° and are positioned symmetrically to the longitudinal plane 18 of the chain link. FIG. 2 and FIG. 3 each show these trimming phases.

According to FIG. 4, the trimming cutter 19, having a cutting edge 20 with a circumference covering the side of the link 16 by 180° with the identical diameter, positioned in its starting position 21, moves in the following sequence:

1. Forward movement up to the burr 17.
2. Tilting by 90° in clockwise direction (FIG. 5).
3. First sectional trimming phase (FIG. 4).
4. Returning of the trimming cutter into Position 1 (FIG. 4).
5. Tilting of the trimming cutter by 180° into the peripheral position which is symmetrical to the center plane of the chain link 18 (FIG. 5).
6. Pushing forward of the trimming cutter for the second sectional trimming phase (FIG. 4).
7. Tilting of the trimming cutter in accordance with Position 2 into the outer position shown in FIG. 5.

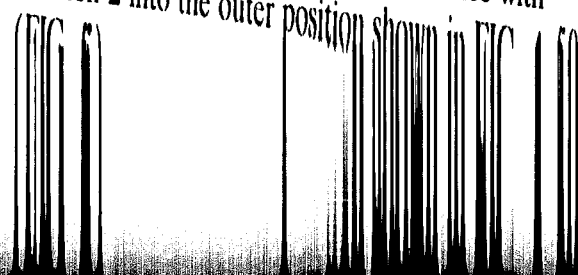

The aobve sequence of operations will allow a time-saving of approximately 25 percent.

Figure 4:
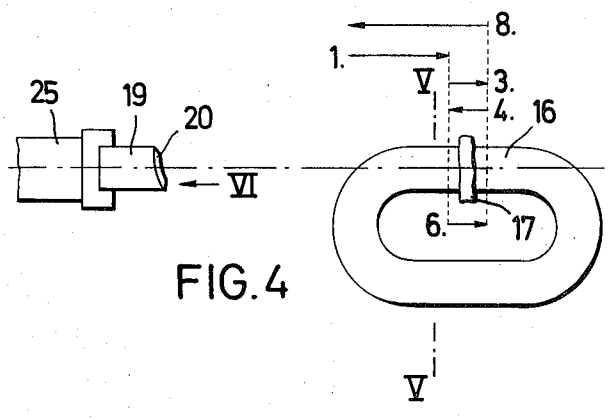
FIG. 4 shows a side view of the chain link according to FIG. 1.
Figure 5:
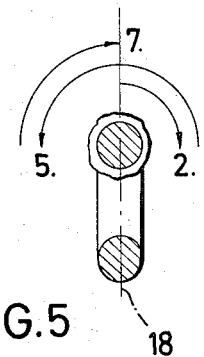
FIG. 5 shows a cross sectional view on section V—V of FIG. 4.
Figure 6:
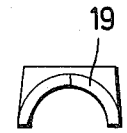
FIG. 6 shows a view of the trimming cutter as seen in the direction of arrow VI, in FIG. 4.
Figure 8:
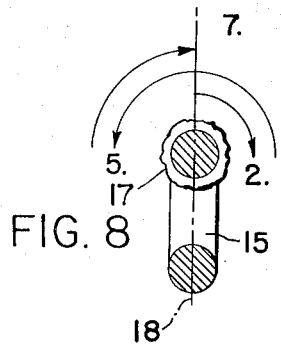
FIG. 8 is a sectional view taken on line VIII—VIII of FIG. 7.
Figure 7:
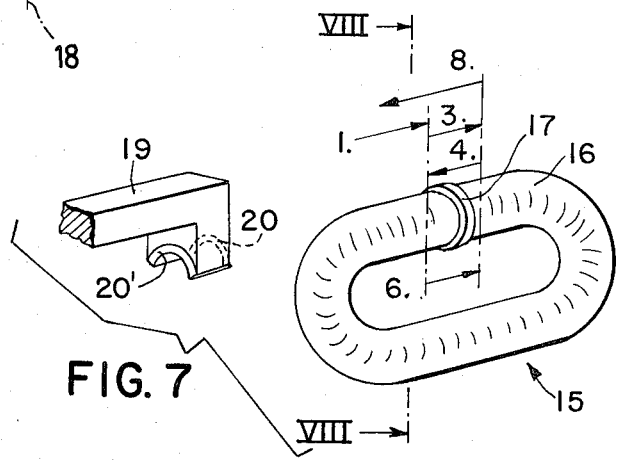
FIG. 7 is a diagrammatic, exploded, perspective view illustrating another method for removing a burr-formation in which the cutter has opposed plural cutting edges.

The cutter in FIG. 4 may be placed in a plane vertical to the forward-movement direction 1, but it may also be designed to have an arrow-shape. The engagement of the cutter with the burr may thereby be made advantageously — as illustrated — via the ends of the cutting edge so that the cutter is pressed hard onto the side of the chain link during the cutting process and the treatment area lines up with the outside cover-area of the link while overcoming any slackness in the operating members.

The instant invention, in comparison with the two prior art methods, provides the additional advantage that the trimming is made on two peripheral sections which are symmetrical about a central plane of the chain link and the process of the invention fully guarantees that the removed burrs of the chain link, which in general are still hot and tend to stick, fall off at the side and not — as in the prior art devices — adhere to the chain link. Also the removal device for removing the burrs may be kept simple and does not require much space, since the path of fall of the trimmed-off burrs is practically clearly established.

What is claimed is:

1. A method for trimming off the weld-burrs on chain link-limbs with circular crosscuts, comprising the steps of utilizing a trimming-cutter which is moved parallel of the axis of a link-limb to be trimmed, in which the trimming device has a cutter-edge over 180° of the crosscut circumference of the link, the cutter-edge having a tilting-movement in two tilt-directions by 90° each, characterized by the steps of moving the trimmer-cutter from a starting position outside the link-area closely to a weld-burr, the trimmer-cutter having a forward- and rearward-cutting edge; next tilting the trimmer-cutter 90° in tilt-sense over the axis of the link-limb, and then moving the trimmer-cutter ahead in the direction of the link-limb axis over the burr for a first partial burr-removal phase, then tilting the trimmer-cutter in the other sense by 180°, thereafter moving the trimmer-cutter back over the burr in the direction of the link-limb axis for a second partial trimming phase, and finally guiding the trimmer-cutter in the first tilt-sense back to an outer position and into a starting position.

2. A method for trimming off weld-burrs on chain links formed by welding rods of circular cross-section using a trimming operations performed in a direction parallel to the longitudinal plane of symmetry of the chain link, removing said first semicircular portion and said second semicircular portion in longitudinal cutting strokes by positioning the cutter sequentially in opposite directions.

3. A method for trimming off weld-burrs on chain links formed by welding rods of circular cross-section, using a trimming cutter, comprising: mounting the cutter so as to enable a reciprocatory movement thereof in a direction parallel to a longitudinal plane of symmetry of the chain link, and a controlled rotary movement thereof in a plane at right angle to said longitudinal plane, forming the cutter with a cutting edge conforming to a periphery of the cross section of said rod; engaging the cutting edge of the cutter with the rod periphery adjacent the weld-burr and removing substantially a first semicircular portion of the weld-burr by shearing and pushing off of the burr in a longitudinal cutting stroke of the trimming cutter, maintaining the longitudinal cutting stroke parallel to said longitudinal plane of symmetry; rotating the cutter in said plane at right angles to the longitudinal plane by 180°; and removing a second semicircular portion of the weld-burr by shearing and pushing off by a second longitudinal stroke, whereby the weld-burr is removed in two shearing operations performed in a direction parallel to the longitudinal plane of symmetry of the chain link, including: forming the cutter with a cutting and shearing edge both at a forward end and a rear end of a cutter tip; moving the cutter rom a starting position longitudinally forward to approach the region of the burr; tilting the cutter by rotation about a longitudinal axis by 90° in a first direction in a plane at right angles to said longitudinal plane; removing of a first semicircular portion of the burr by a forward longitudinal shearing stroke of the cutter by the action at its said forward end; tilting of the cutter by rotation about said first direction and removing of the second semicircular portion of the burr by a backward longitudinal shearing stroke in a direction opposite to said forward stroke and by the action of a cutting edge at said rear end of the cutter tip; tilting the cutter by rotation about said axis by 90° in said first direction and returning the cutter to its said starting position, whereby the weld-burr is removed by one forward and one return cutting stroke of the cutter.

4. The method as claimed in claim 2 including the step of forming the cutter trimmer with at least one cutter edge facing in the direction of a longitudinal cutting stroke.

5. The method as set for in claim 1 comprising: forming the cutter edge substantially semicircular; mounting the tool and moving the tool in a reciprocatory manner in a longitudinal direction which is perpendicular to a plane containing said semicircular cutter edge; and effecting controlled angular movement of the tool about an axis which is the axis of rotational symmetry of said semicircular cutter edge, removing a weld-burr on the limb of welded chain link by successive shearing operations of the cutter edge of the cutting tool which is moved in said longitudinal direction and engages part of the burr circumference in each of the successive shearing operations.

* * * * *